US012752796B2

(12) United States Patent
Sul

(10) Patent No.: US 12,752,796 B2
(45) Date of Patent: Oct. 6, 2026

(54) DEVICE AND METHOD FOR ESTIMATING DYNAMIC INFORMATION

(71) Applicant: HL Klemove Corp., Incheon (KR)

(72) Inventor: Jong-Wun Sul, Incheon (KR)

(73) Assignee: HL Klemove Corp., Incheon (KR)

( * ) Notice: Subject to any disclaimer, the term of this patent is extended or adjusted under 35 U.S.C. 154(b) by 0 days.

(21) Appl. No.: 18/896,378

(22) Filed: Sep. 25, 2024

(65) Prior Publication Data

US 2025/0388219 A1 Dec. 25, 2025

(30) Foreign Application Priority Data

Jun. 25, 2024 (KR) ........................ 10-2024-0083115

(51) Int. Cl.
*B60W 40/114* (2012.01)

(52) U.S. Cl.
CPC ....... *B60W 40/114* (2013.01); *B60W 2520/10* (2013.01); *B60W 2520/14* (2013.01)

(58) Field of Classification Search
CPC ........... B60W 40/114; B60W 2520/10; B60W 2520/14
See application file for complete search history.

(56) References Cited

U.S. PATENT DOCUMENTS

2009/0005946 A1* 1/2009 Futamura .............. B60T 8/1708 701/70
2017/0363727 A1* 12/2017 Prasad ................. G08G 1/0962
2019/0009815 A1* 1/2019 Lavoie ................... B62D 13/06

FOREIGN PATENT DOCUMENTS

KR 10-1803745 B1 12/2017
KR 10-2019-0060574 A 6/2019
KR 10-2023-0101996 A 7/2023

* cited by examiner

*Primary Examiner* — Long T Tran
*Assistant Examiner* — Charles J Brauch
(74) *Attorney, Agent, or Firm* — Studebaker Brackett PLLC

(57) ABSTRACT

Embodiments of the disclosure relate to a dynamic information estimation technology receiving host vehicle information using one or more sensors, obtaining trailer information using a radar sensor when it is determined that the trailer information is required using the host vehicle information and a yaw rate threshold, determining whether distance information between a host vehicle and a trailer included in the trailer information is included in a preset range and, if it is determined that the distance information is included in the preset range, calculating a trailer hitch angle, mapping the host vehicle information, the trailer information, and the trailer hitch angle and storing as a set, and calculating a trailer yaw rate and a trailer length using the set and an optimization algorithm if a number of sets meets a number condition.

18 Claims, 6 Drawing Sheets

DEVICE AND METHOD FOR ESTIMATING DYNAMIC INFORMATION

CROSS-REFERENCE TO RELATED APPLICATION

This application claims priority from Korean Patent Application No. 10-2024-0083115, filed on Jun. 25, 2024, which is hereby incorporated by reference for all purposes as if fully set forth herein.

BACKGROUND

Field

Embodiments of the disclosure relate to a device and method for estimating dynamic information.

Description of Related Art

A rear camera, an ultrasonic sensor, and a radar sensor of a vehicle are used not only for recognizing a trailer positioned behind, but also for assisting in parking the trailer and for alarming a blind spot. In particular, studies are being conducted on trailer recognition based on a point cloud (hereinafter referred to as a radar point cloud) collected from radars. However, the information collected based on the radar point cloud may be less useful unless it is of high resolution. Further, the radar point cloud does not recognize an accurate trailer shape (edge).

However, vehicle radar sensors may accurately measure the distance, the speed, and the angle using the Doppler frequency, and have fewer limitations in the use environment than cameras. However, development of technology for recognizing a trailer positioned behind a vehicle by estimating dynamic information about the trailer using radar sensors is immature.

BRIEF SUMMARY

The present embodiments may provide a dynamic information estimation device for estimating dynamic information about an object using a vehicle sensor.

The present embodiments may provide a dynamic information estimation method for estimating dynamic information about an object using a vehicle sensor.

In an aspect, the present embodiments may provide a dynamic information estimation device, comprising a vehicle information receiver receiving host vehicle information using one or more sensors, a trailer information obtainer obtaining trailer information using a radar sensor when it is determined that the trailer information is required using the host vehicle information and a yaw rate threshold, an angle calculator determining whether distance information between a host vehicle and a trailer included in the trailer information is included in a preset range and, if it is determined that the distance information is included in the preset range, calculating a trailer hitch angle, a storage unit mapping the host vehicle information, the trailer information, and the trailer hitch angle and storing as a set, and a calculator calculating a trailer yaw rate and a trailer length using the set and an optimization algorithm if a number of sets meets a number condition.

In another aspect, the present embodiments may provide a dynamic information estimation method, comprising receiving host vehicle information using one or more sensors, obtaining trailer information using a radar sensor when it is determined that the trailer information is required using the host vehicle information and a yaw rate threshold, determining whether distance information between a host vehicle and a trailer included in the trailer information is included in a preset range and, if it is determined that the distance information is included in the preset range, calculating a trailer hitch angle, mapping the host vehicle information, the trailer information, and the trailer hitch angle and storing as a set, and calculating a trailer yaw rate and a trailer length using the set and an optimization algorithm if a number of sets meets a number condition.

In another aspect, a computer-readable, non-transitory recording medium storing a computer-executable program instruction executed by a processor to operate a computer system may comprise receiving host vehicle information using one or more sensors, obtaining trailer information using a radar sensor when it is determined that the trailer information is required using the host vehicle information and a yaw rate threshold, determining whether distance information between a host vehicle and a trailer included in the trailer information is included in a preset range and, if it is determined that the distance information is included in the preset range, calculating a trailer hitch angle, mapping the host vehicle information, the trailer information, and the trailer hitch angle and storing as a set, and calculating a trailer yaw rate and a trailer length using the set and an optimization algorithm if a number of sets meets a number condition.

According to the present embodiments, there may be provided a dynamic information estimation device for estimating dynamic information about an object using a vehicle sensor.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
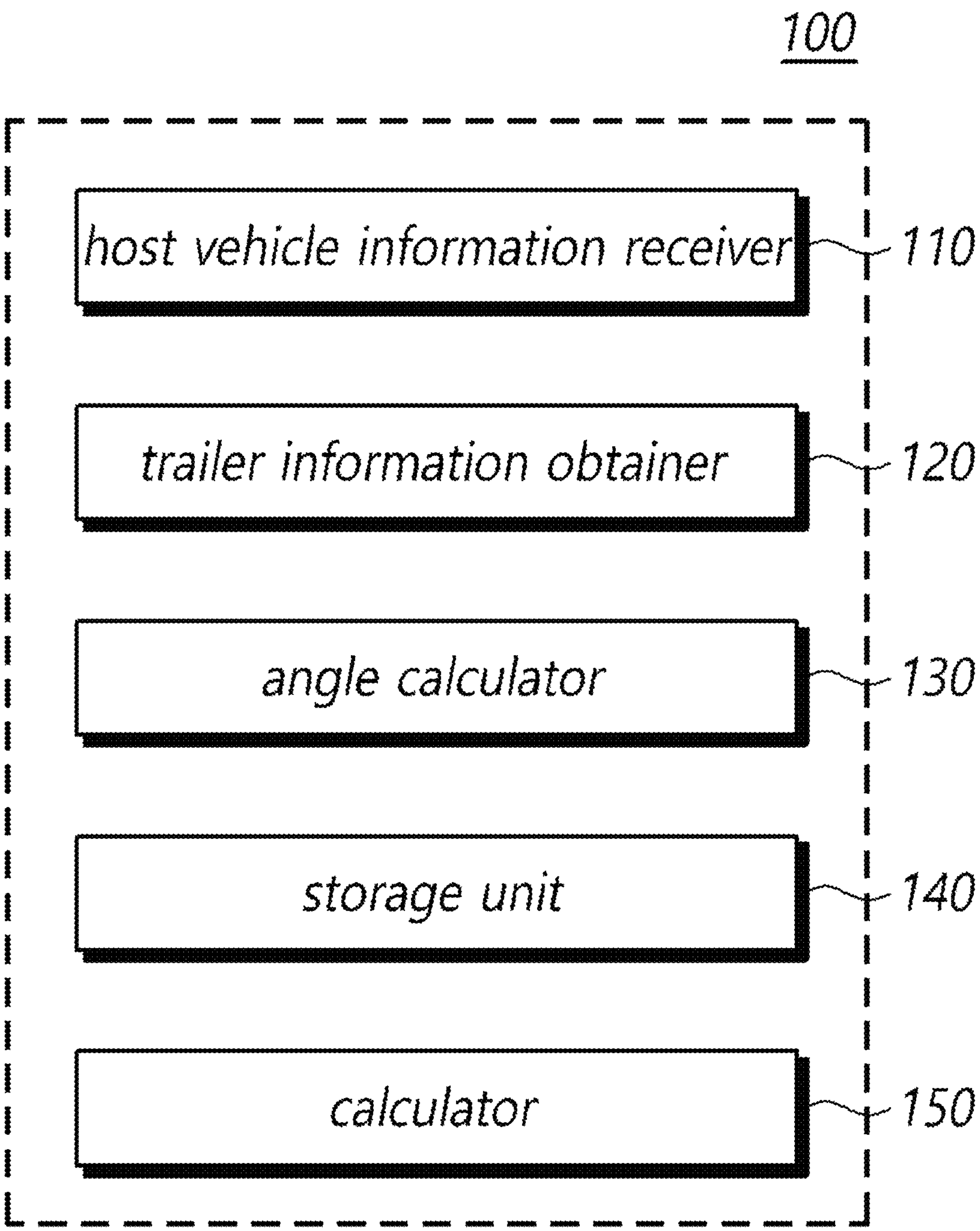
FIG. 1 is a view illustrating a dynamic information estimation device according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

FIG. 1 is a view illustrating a dynamic information estimation device according to an embodiment.

Referring to FIG. 1, a dynamic information estimation device 100 may include a vehicle information receiver 110 receiving host vehicle information using one or more sensors, a trailer information obtainer 120 obtaining trailer information using a radar sensor when it is determined that the trailer information is required using the host vehicle information and a yaw rate threshold, an angle calculator 130 determining whether distance information between a host vehicle and a trailer included in the trailer information is included in a preset range and, if it is determined that the distance information is included in the preset range, calculating a trailer hitch angle, a storage unit 140 mapping the host vehicle information, the trailer information, and the trailer hitch angle and storing as a set, and a calculator 150 calculating a trailer yaw rate and a trailer length using the set and an optimization algorithm if a number of sets meets a number condition.

The receiver 110 may receive host vehicle information using one or more sensors.

For example, the one or more sensors may include a velocity sensor capable of measuring and detecting host vehicle velocity information about the vehicle driven by the driver. The one or more sensors may include a yaw rate sensor capable of measuring and detecting yaw rate information about the vehicle driven by the driver. The one or more sensors may include an acceleration sensor capable of measuring and detecting acceleration information about the vehicle driven by the driver. The one or more sensors may include a lidar sensor, a camera sensor, and a radar sensor to drive an advanced driver assistance system (ADAS) for assisting driving of the vehicle driven by the driver.

However, the one or more sensors are not limited to the present embodiment and may include various sensors. Further, the receiver 110 may receive information set by default for the host vehicle as the host vehicle information even when one or more sensors are not used.

As another example, the host vehicle information may include at least one of host vehicle velocity information, host vehicle yaw rate information, and distance information between the host vehicle and the hitch. The host vehicle information may refer to information about the vehicle driven by the driver.

For example, the host vehicle information may include host vehicle velocity information. The host vehicle velocity information may refer to the velocity of the host vehicle measured using the velocity sensor of the host vehicle.

As another example, the host vehicle yaw rate information may mean the yaw rate of the host vehicle measured using the yaw rate sensor of the host vehicle. Yaw rate refers to the horizontal rotation velocity of the vehicle. Therefore, the host vehicle yaw rate information may be used to evaluate the stability of the host vehicle. For convenience of description, it is described below using the definition of yaw rate.

For example, when the yaw rate is positive, it may be determined that the vehicle is rotating clockwise. Further, when the yaw rate is negative, it may be determined that the vehicle is rotating counterclockwise. Further, when the yaw rate is 0, it may be determined that the vehicle does not rotate. In other words, if the yaw rate is 0, it may be determined that it is driving straight or stopped.

As another example, the host vehicle information may not only include information received using one or more sensors, but may also include information set by default for the host vehicle.

For example, the information set by default for the host vehicle may include distance information between the host vehicle and the hitch. The distance information between the host vehicle and the hitch may refer to a distance from the shaft of the rear wheels of the vehicle to the hitch disposed on the rear surface of the vehicle.

However, the host vehicle information is not limited to the present embodiment and may include various pieces of information.

The trailer information obtainer 120 may obtain the trailer information using a radar sensor included in one or more sensors when it is determined that the trailer information is necessary using the host vehicle information and a yaw rate threshold.

The yaw rate threshold is a threshold set to determine whether the host vehicle yaw rate information is appropriate. This is because, if the vehicle yaw rate information corresponds to 0, it may be difficult to estimate dynamic information about the trailer of the vehicle. Accordingly, the trailer information obtainer 120 sets the yaw rate threshold, compares the yaw rate information with the host vehicle yaw rate information, and obtains trailer information.

For example, the yaw rate threshold may be set to N (where N is a real number). However, the yaw rate threshold is not limited to the present embodiment and may be set to various numbers.

For example, when it is determined that the host vehicle yaw rate information included in the host vehicle information exceeds the yaw rate threshold, the trailer information obtainer 120 may determine that the trailer information is necessary.

As another example, the trailer information may include at least one of trailer velocity information, trailer angle information, and distance information between the host vehicle and the trailer.

The trailer information obtainer 120 may obtain trailer information using the radar sensor included in one or more sensors. The radar sensor has a structure to receive a reception signal by transmitting a transmission signal toward an object (e.g., the trailer).

For example, the distance information between the host vehicle and the trailer may be obtained as a distance calculated using the delayed time between the transmission signal and the reception signal. In this case, the distance information between the host vehicle and the trailer may mean a distance from the radar sensor of the host vehicle to the rear surface of the trailer.

For example, the trailer velocity information may mean a value calculated using a frequency change in the reception signal.

For example, the trailer angle information may be obtained by calculating an angle of a signal using a phase difference between the transmission signal and the reception signal. In this case, the trailer angle information may include an azimuth or an elevation angle.

However, the disclosure is not limited thereto, and the trailer information may include various pieces of information.

The angle calculator 130 may determine whether the distance information between the host vehicle and the trailer included in the trailer information is included in a preset range, and when it is determined that the distance information is included in the preset range, calculate the trailer hitch angle.

If the distance information between the host vehicle and the trailer is not included in the preset range, it may not be necessary to calculate the hitch angle between the host vehicle and the trailer. The reason why the hitch angle is required is that there may be a case in which the vehicle and the trailer are fastened using the hitch. Accordingly, the angle calculator 130 preemptively determines whether the distance information between the host vehicle and the trailer is included in the preset range. Hereinafter, a detailed configuration necessary for calculating the hitch angle by the angle calculator 130 is described.

For example, the preset range may mean a value set using a maximum length detectable by the radar sensor and an error range. The maximum length detectable by the radar sensor may be A m (where A is a real number larger than or equal to 0), and the error may be set to ±B % (where B is a real number larger than or equal to 0).

For example, the preset range may be set to a value obtained by adding or subtracting ±B %, which is the error, to/from A m. For example, the preset range may be set to a ±10% range with respect to the maximum length of 6 m that may be detected by the radar sensor.

However, the maximum length detectable by the radar sensor and error may be set to differ according to the performance of the radar sensor, and the maximum length detectable by the radar sensor and error may be set to differ according to the lengths of the vehicle and the trailer detected by the radar sensor.

Accordingly, the maximum length detectable by the radar sensor and error may be set without being limited to the present embodiment.

For example, the trailer hitch angle may refer to an angle formed by the host vehicle and the trailer. Further, the trailer hitch angle may correspond to at least one of a transverse angle or a longitudinal angle formed by the host vehicle and the trailer. However, the present embodiment is not limited, and the trailer hitch angle may be set to various ones.

Further, the operation of calculating the hitch angle by the angle calculator 130 is described below with reference to FIGS. 3 and 4.

The storage unit 140 may map the host vehicle information, the trailer information, and the trailer hitch angle and store them as a set.

For example, the storage 140 may map the host vehicle velocity information, the host vehicle rate information, the distance information between the host vehicle and the hitch, and the trailer hitch angle included in the host vehicle information, and store them as a set. Further, the storage unit 140 may map the trailer velocity information and the trailer hitch angle included in the trailer information and store the same as a set. Alternatively, the storage unit 140 may map the host vehicle velocity information, the host vehicle rate information, the distance information between the host vehicle and the hitch, the trailer velocity information, and the trailer hitch angle and store them as a set. However, the present embodiment is not limited thereto, and the storage unit 140 may map various pieces of information and store the same as a set.

When the number of sets meets a number condition, the calculator 150 may calculate the trailer yaw rate and the trailer length using the set and an optimization algorithm.

Embodiments of the disclosure are ones for estimating and calculating dynamic information about a trailer including a trailer yaw rate and a trailer length. If a sufficient number of sets are not stored in the storage unit 140, accuracy may be reduced when calculating the trailer yaw rate and the trailer length. Accordingly, the number condition is set to determine whether the number of sets stored in the storage unit 140 is sufficient.

For example, the number condition may be set using C (where C is an integer larger than or equal to 1). For example, the number condition may be set as whether the number of sets is larger than C. As another example, the number condition may be set as whether the number of sets is smaller than C. However, without being limited to the present embodiment, the number condition may be set.

For example, the optimization algorithm may be a gradient descent algorithm.

The gradient descent algorithm is an algorithm that obtains the slope of a function, continues to move in the opposite direction of the slope, and repeats it until it reaches an extreme value. The gradient descent algorithm is a general algorithm used to solve machine learning, deep learning, and mathematical problems.

The gradient descent algorithm according to the present embodiment may be utilized to find the optimal solution of the trailer rate and the trailer length based on the host vehicle velocity information, the host vehicle rate information, the distance information between the host vehicle and the trailer, and the trailer hitch angle included in the set.

However, without being limited the present embodiment, the optimization algorithm may be any algorithm capable of finding the optimal solution of the trailer yaw rate and the trailer length.

For example, the trailer yaw rate is an estimated value of the yaw rate (horizontal rotation velocity) of the trailer, and may mean an optimal solution of the estimated value of the yaw rate of the trailer found using the gradient descent algorithm.

For example, the trailer length is an estimated length value of the trailer, and may mean an optimal solution of the estimated length value of the trailer found using the gradient descent algorithm.

A detailed description of a method for calculating a trailer yaw rate and a trailer length is described below with reference to FIG. 4.

For example, the trailer information obtainer 120 may re-receive the trailer information, and the calculator 150 may re-receive the trailer information and evaluate the trailer length using the re-received trailer information. Even if the trailer length is calculated, it is necessary to verify whether the calculated trailer information is reliable information. Accordingly, the trailer information obtainer 120 may re-receive the trailer angle information and the distance information between the host vehicle and the trailer included in the trailer information. The operation of the calculator 150 to re-receive the trailer information and evaluate the trailer length using the re-received trailer information is described with reference to a specific example.

For example, the calculator 150 may evaluate the trailer length by comparing the re-received trailer information with the trailer length. In this case, when it is determined that the re-received trailer information is longer than the trailer length, the calculator 150 may recalculate the trailer yaw rate and the trailer length.

In other words, when it is determined that the distance information between the host vehicle and the trailer included in the re-received trailer information is larger than the trailer length, it may be determined that the trailer length is incorrectly calculated. In this case, the trailer length may be recalculated. Further, since the trailer yaw rate may change when the trailer length is recalculated, the trailer yaw rate may also be recalculated.

Hereinafter, more various embodiments that may be performed by the above-described dynamic information estimation device are described. Each of the embodiments described below may be performed by a dynamic information estimation device through any combination.

Figure 2:
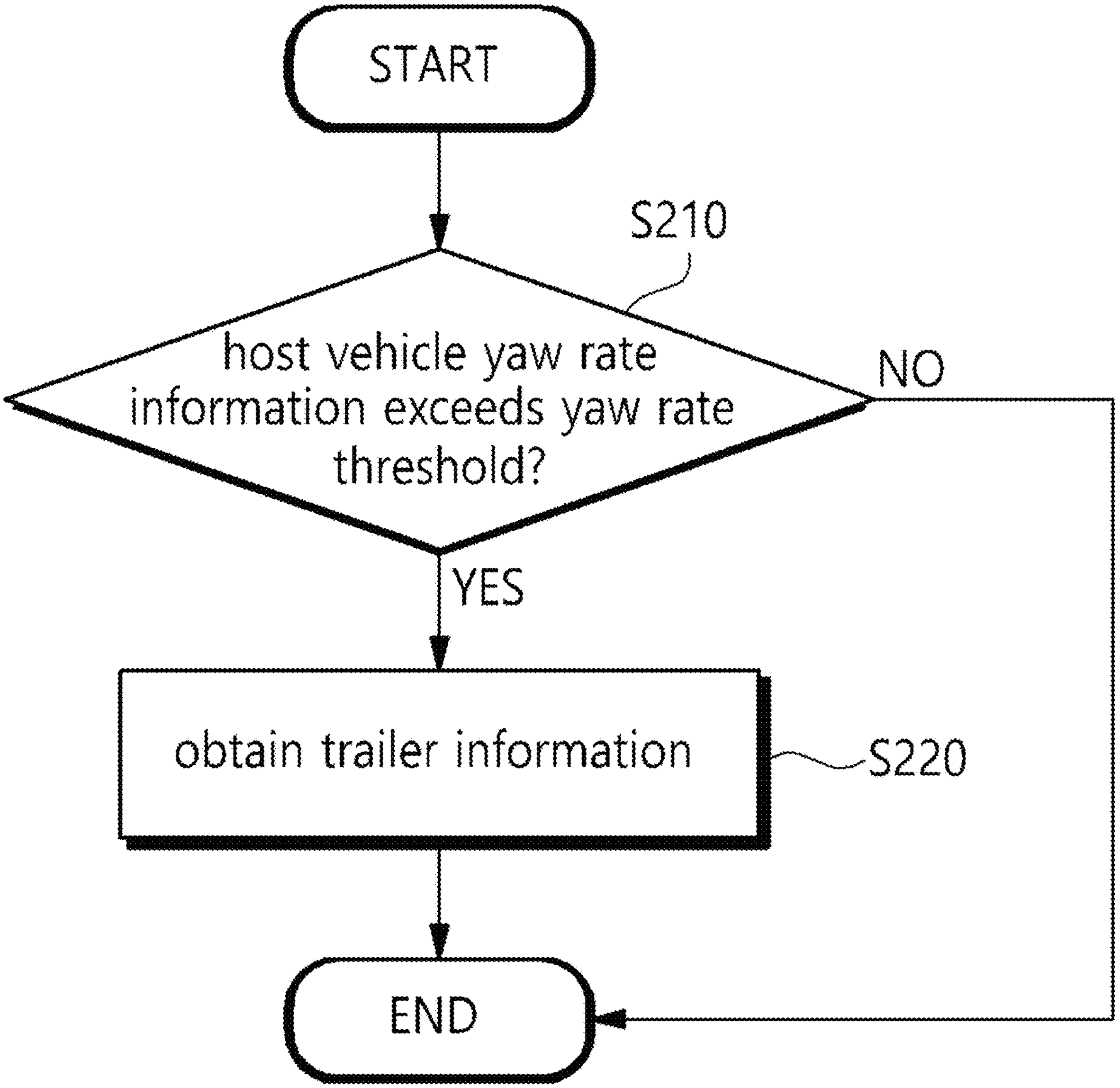
FIG. 2 is a view illustrating operations of a trailer information obtainer according to an embodiment.

FIG. 2 is a view illustrating operations of a trailer information obtainer according to an embodiment.

The trailer information obtainer may determine whether the host vehicle yaw rate information exceeds the yaw rate threshold. (S210)

In this case, the trailer information obtainer may obtain the trailer information when it is determined that the vehicle yaw rate information exceeds the yaw rate threshold. (S220)

For example, when the yaw rate threshold is set to 0 and the host vehicle yaw rate information exceeds 0, the host vehicle may be in a state of rotating counterclockwise. In this case, the host vehicle may be suitable for obtaining trailer information, which is dynamic information about the trailer. Accordingly, in this case, it is determined that the trailer information is necessary, so that the trailer information may be obtained.

On the other hand, when it is determined that the host vehicle yaw rate information does not exceed the yaw rate threshold, the trailer information obtainer may not obtain the trailer information.

For example, if the yaw rate threshold is set to 0 and the host vehicle yaw rate information corresponds to 0, the host vehicle may be driving straight or in a stopped state. In this case, the host vehicle may not be suitable for obtaining trailer information, which is dynamic information about the trailer. Accordingly, in this case, the trailer information may not be obtained because it is determined that the trailer information is not required.

Although the present embodiment has been described using the result obtained by setting the yaw rate threshold to 0 and comparing it with the host vehicle yaw rate information, the present embodiment is not limited thereto, and the yaw rate threshold may be set to various real numbers.

Further, in the present embodiment, only the host vehicle yaw rate information and the yaw rate threshold are compared, but the absolute value of the host vehicle yaw rate information and the yaw rate threshold may be compared. However, without being limited to the present embodiments, the trailer estimator may determine that trailer information is required in various ways.

Figure 3:
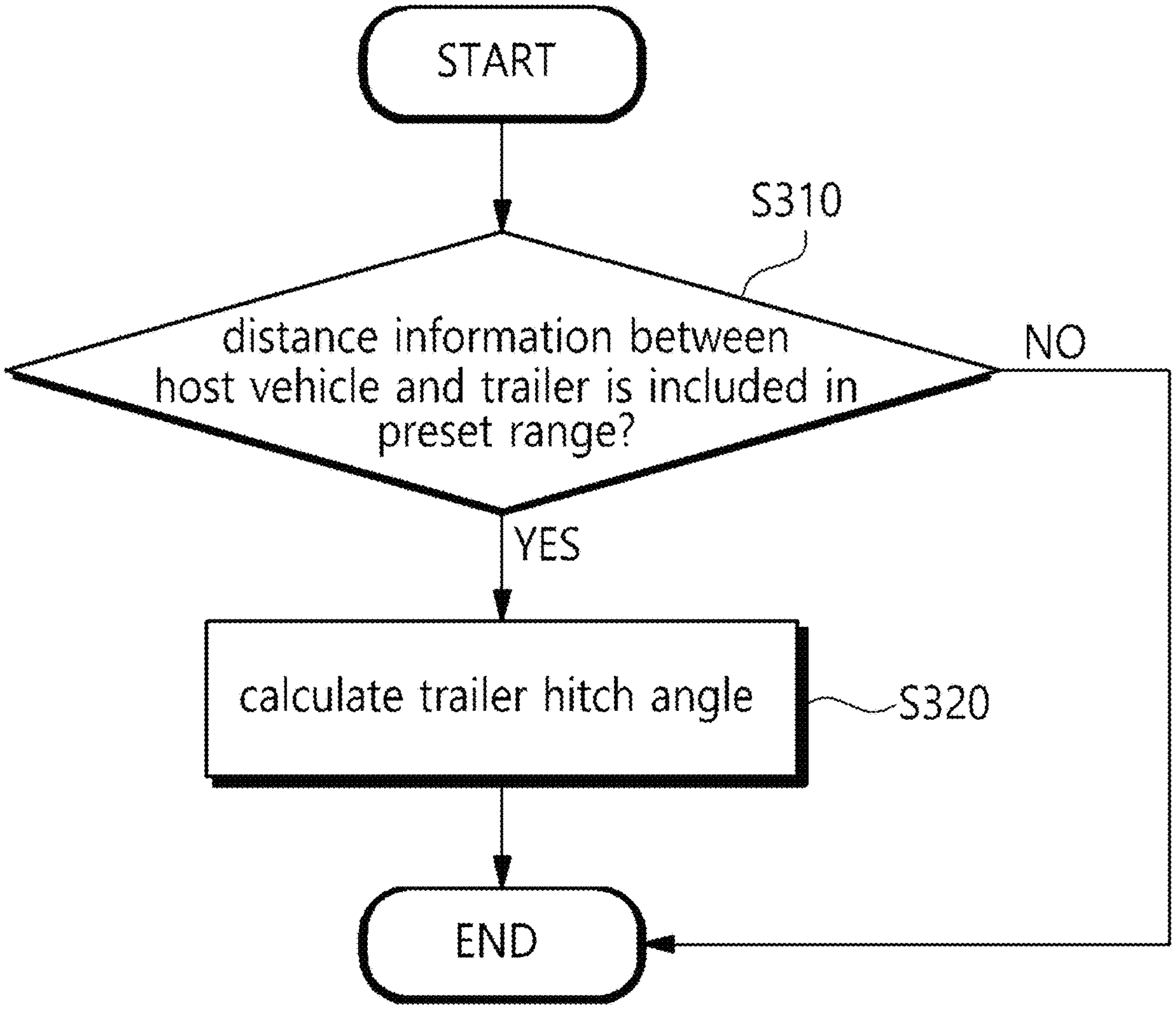
FIG. 3 is a view illustrating operations of an angle calculator according to an embodiment.

FIG. 3 is a view illustrating operations of an angle calculator according to an embodiment;

The trailer angle calculator may determine whether the distance information between the host vehicle and the trailer is included in a preset range. (S310)

In this case, if it is determined that the distance information between the host vehicle and the trailer is included in the preset range, the angle calculator may calculate the trailer hitch angle. (S320)

On the other hand, if it is determined that the distance information between the host vehicle and the trailer is not included in the preset range, the angle calculator may not calculate the trailer hitch angle.

However, the present embodiment is merely an example operation of the angle calculator, and various operations may be performed.

Figure 4:
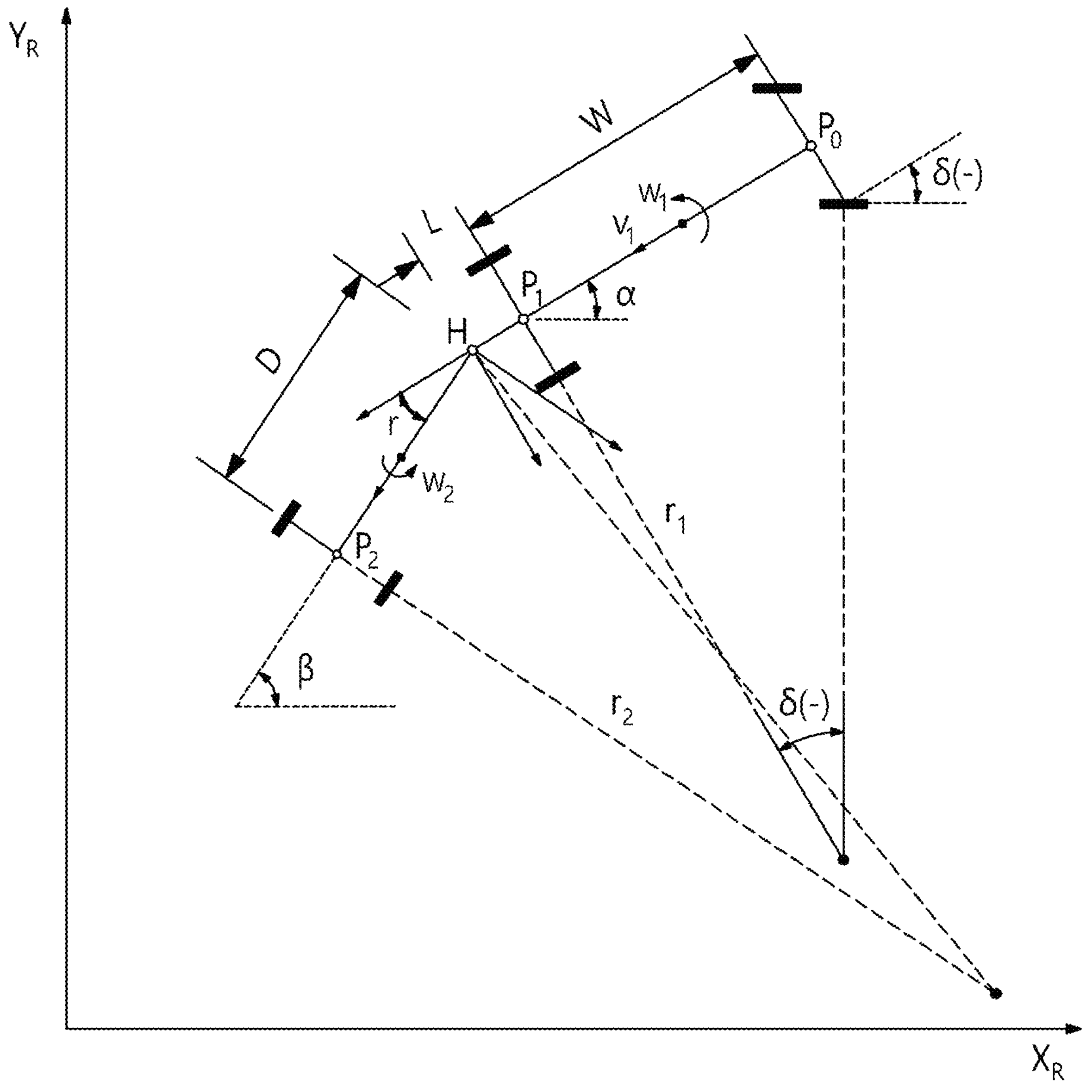
FIG. 4 is a view illustrating an operation of calculating a trailer hitch angle, a trailer length, and a trailer yaw rate, according to an embodiment.

FIG. 4 is a view illustrating an operation of calculating a trailer hitch angle, a trailer length, and a trailer yaw rate, according to an embodiment;

Referring to FIG. 4, W may mean the horizontal distance between the front wheel P0 of the host vehicle and the center of the rear wheel P1, D may mean the trailer length (distance from H to P2), L may mean the distance information between the host vehicle and the hitch, δ may mean the front wheel steering angle, γ may mean the trailer hitch angle, v1 may mean the host vehicle velocity information, v2 may mean the trailer velocity information, w1 may mean the host vehicle yaw rate information, w2 may mean the trailer yaw rate, α may mean the yaw rate angle of the host vehicle, and β may mean the yaw rate angle of the trailer. The horizontal axis of FIG. 4 may mean the x-axis, and the vertical axis may mean the y-axis.

Equations 1 and 2 relate to equations for calculating the trailer hitch angle according to the present embodiment.

$$v_2 = v_1 * \cos(\gamma) + \omega_1 * L * \sin(\gamma) \quad \text{[Equation 1]}$$

$$\gamma = a\tan\left(\frac{\omega_1 * L}{v_1}\right) \pm a\cos\left(\frac{v_2}{\sqrt{(\omega_1 * L)^2 + v_1^2}}\right) \quad \text{[Equation 2]}$$

The trailer hitch angle γ may be calculated using the distance information L between the host vehicle and the hitch, the yaw rate information w1, the host vehicle velocity information v1, and the trailer velocity information v2. However, without being limited thereto, the trailer velocity information may be calculated by various components and equations.

Equation 3 relates to an equation for calculating the trailer length and the trailer yaw rate according to the present embodiment.

$$D * \omega_2 = v_1 * \sin(\gamma) + \omega_1 * L * \cos(\gamma) \quad \text{[Equation 3]}$$

The trailer length D and the trailer yaw rate w2 may not receive information only with the radar sensor. Accordingly, the calculator may calculate the trailer length D and the trailer yaw rate w2 using the host vehicle velocity information v1, the trailer hitch angle γ, the host vehicle yaw rate information w1, the distance information L between the host vehicle and the hitch, and the gradient descent algorithm.

Figure 5:
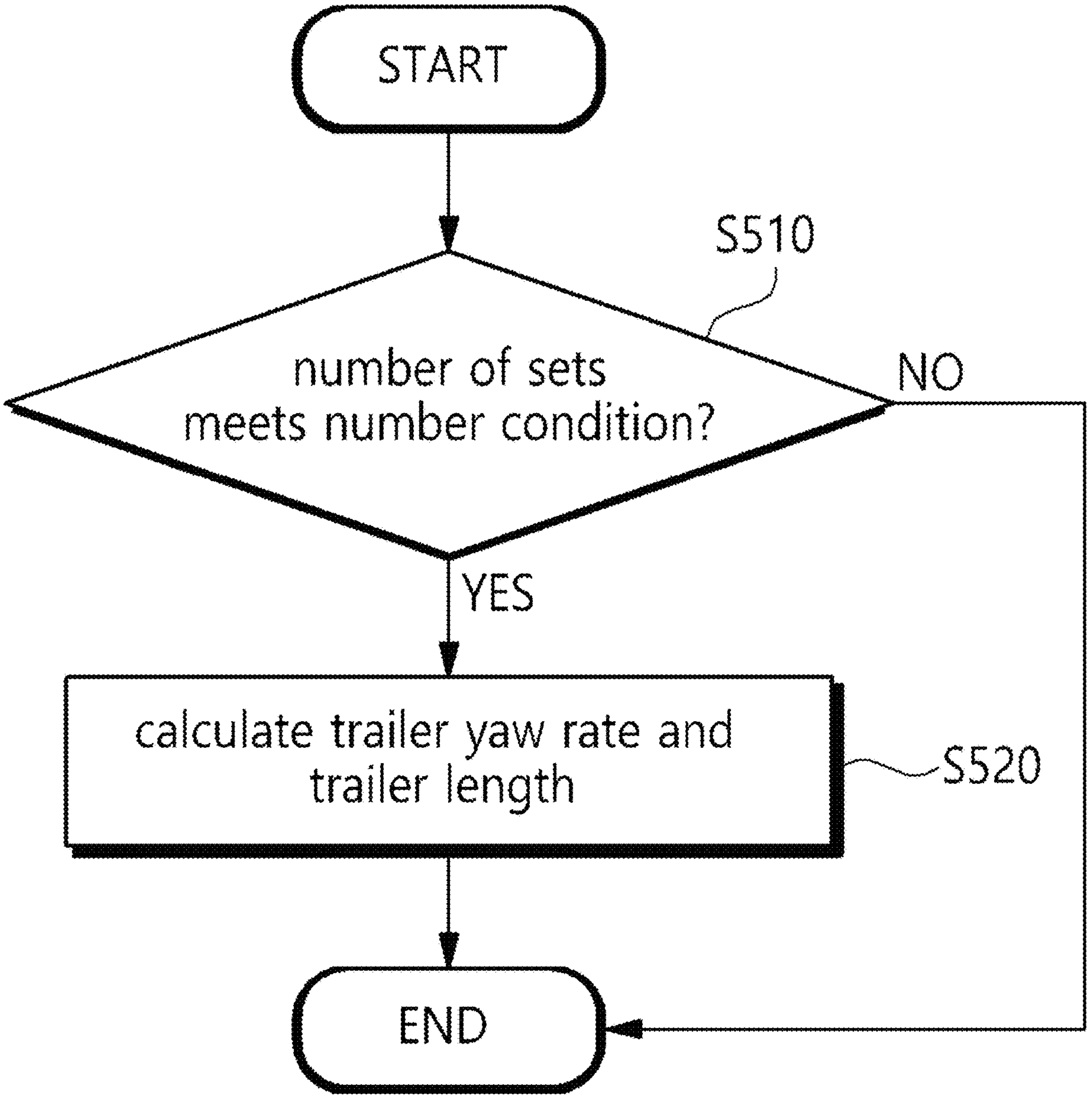
FIG. 5 is a view illustrating operations of a calculator according to an embodiment.

FIG. 5 is a view illustrating operations of a calculator according to an embodiment; and Referring to FIG. 5, if the number of sets meets the number condition, the calculator may calculate the trailer rate and the trailer length using the set and the optimization algorithm.

The calculator may determine whether the number of sets meets the number condition. (S510)

If the number of sets meets the number condition, the calculator may calculate the trailer yaw rate and the trailer length. (S520)

In contrast, if the number of sets does not meet the number condition, the calculator may not calculate the trailer yaw rate and the trailer length.

However, the present embodiment is merely an example operation of the calculator, and various operations may be performed.

Figure 6:
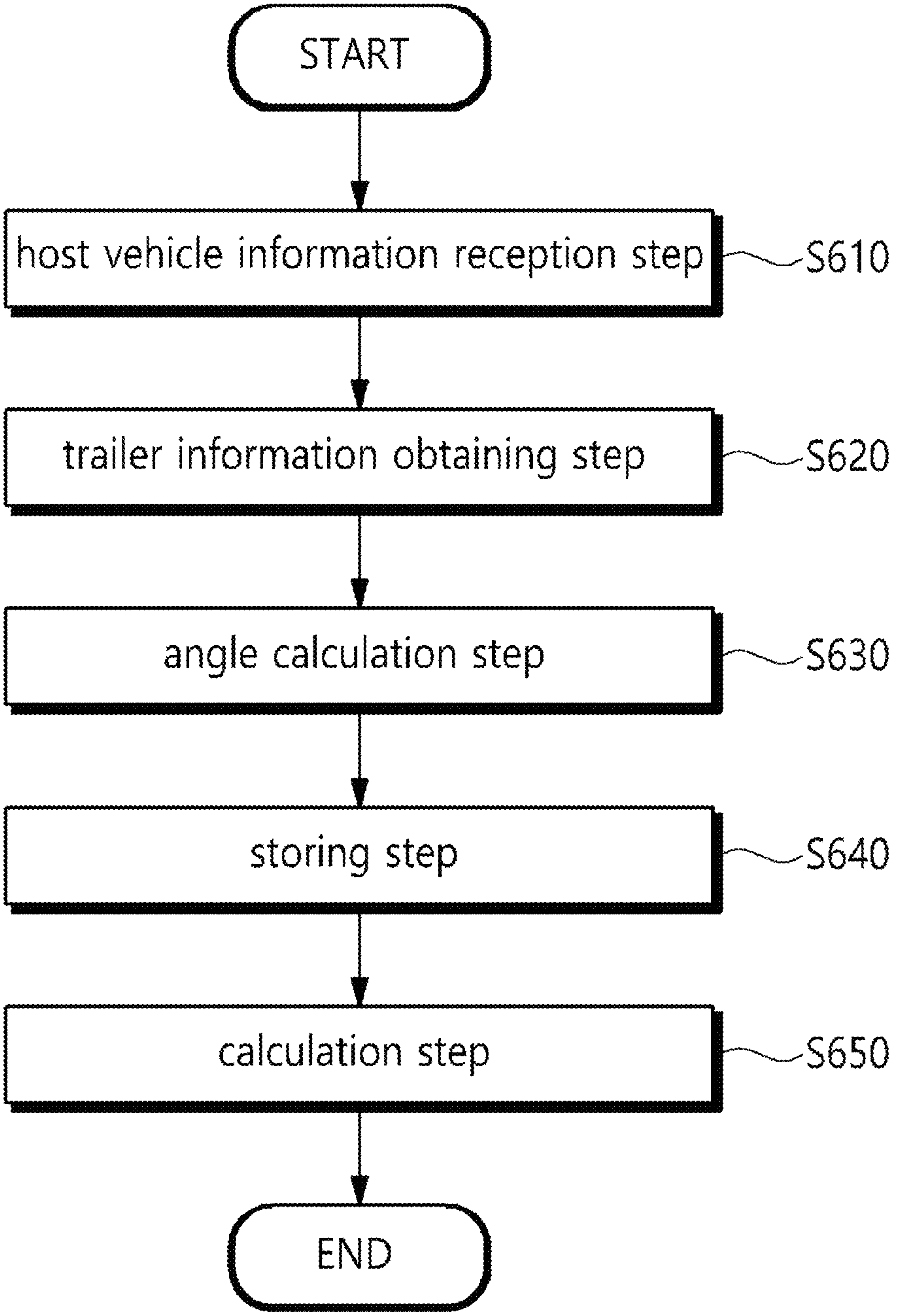
FIG. 6 is a flowchart illustrating a dynamic information estimation method according to an embodiment.

FIG. 6 is a flowchart illustrating a dynamic information estimation method according to an embodiment.

Referring to FIG. 6, a dynamic information estimation method may include a vehicle information reception step S610 receiving host vehicle information using one or more sensors, a trailer information obtaining step S620 obtaining trailer information using a radar sensor when it is determined that the trailer information is required using the host vehicle information and a yaw rate threshold, an angle calculation step S630 determining whether distance information between a host vehicle and a trailer included in the trailer information is included in a preset range and, if it is determined that the distance information is included in the preset range, calculating a trailer hitch angle, a storing step S640 mapping the host vehicle information, the trailer information, and the trailer hitch angle and storing as a set, and a calculation step S650 calculating a trailer yaw rate and a trailer length using the set and an optimization algorithm if a number of sets meets a number condition.

The reception step may receive host vehicle information using one or more sensors. (S610)

For example, the one or more sensors may include a velocity sensor capable of measuring and detecting host vehicle velocity information about the vehicle driven by the driver. The one or more sensors may include a yaw rate sensor capable of measuring and detecting yaw rate information about the vehicle driven by the driver. The one or more sensors may include an acceleration sensor capable of measuring and detecting acceleration information about the vehicle driven by the driver. The one or more sensors may include a lidar sensor, a camera sensor, and a radar sensor to drive an advanced driver assistance system (ADAS) for assisting driving of the vehicle driven by the driver.

However, the one or more sensors are not limited to the present embodiment and may include various sensors. Further, the reception step may receive information set by default for the host vehicle as the host vehicle information even when one or more sensors are not used.

As another example, the host vehicle information may include at least one of host vehicle velocity information, host vehicle yaw rate information, and distance information between the host vehicle and the hitch. The host vehicle information may refer to information about the vehicle driven by the driver.

For example, the host vehicle information may include host vehicle velocity information. The host vehicle velocity information may refer to the velocity of the host vehicle measured using the velocity sensor of the host vehicle.

As another example, the host vehicle yaw rate information may mean the yaw rate of the host vehicle measured using the yaw rate sensor of the host vehicle. Yaw rate refers to the horizontal rotation velocity of the vehicle. Therefore, the host vehicle yaw rate information may be used to evaluate the stability of the host vehicle. For convenience of description, it is described below using the definition of yaw rate.

For example, when the yaw rate is positive, it may be determined that the vehicle is rotating clockwise. Further, when the yaw rate is negative, it may be determined that the vehicle is rotating counterclockwise. Further, when the yaw rate is 0, it may be determined that the vehicle does not rotate. In other words, if the yaw rate is 0, it may be determined that it is driving straight or stopped.

As another example, the host vehicle information may not only include information received using one or more sensors, but may also include information set by default for the host vehicle.

For example, the information set by default for the host vehicle may include distance information between the host vehicle and the hitch. The distance information between the host vehicle and the hitch may refer to a distance from the shaft of the rear wheels of the vehicle to the hitch disposed on the rear surface of the vehicle.

However, the host vehicle information is not limited to the present embodiment and may include various pieces of information.

The trailer information obtaining step may obtain the trailer information using a radar sensor included in one or more sensors when it is determined that the trailer information is necessary using the host vehicle information and a yaw rate threshold. (S620)

The yaw rate threshold is a threshold set to determine whether the host vehicle yaw rate information is appropriate. This is because, if the vehicle yaw rate information corresponds to 0, it may be difficult to estimate dynamic information about the trailer of the vehicle. Accordingly, the trailer information obtaining step sets the yaw rate threshold, compares the yaw rate information with the host vehicle yaw rate information, and obtains trailer information.

For example, the yaw rate threshold may be set to N (where N is a real number). However, the yaw rate threshold is not limited to the present embodiment and may be set to various numbers.

For example, when it is determined that the host vehicle yaw rate information included in the host vehicle information exceeds the yaw rate threshold, the trailer information obtaining step may determine that the trailer information is necessary.

As another example, the trailer information may include at least one of trailer velocity information, trailer angle information, and distance information between the host vehicle and the trailer.

The trailer information obtaining step may obtain trailer information using the radar sensor included in one or more sensors. The radar sensor has a structure to receive a reception signal by transmitting a transmission signal toward the trailer.

For example, the distance information between the host vehicle and the trailer may be obtained as a distance calculated using the delayed time between the transmission signal and the reception signal. In this case, the distance information between the host vehicle and the trailer may mean a distance from the radar sensor of the host vehicle to the rear surface of the trailer.

For example, the trailer velocity information may mean a value calculated using a frequency change in the reception signal.

For example, the trailer angle information may be obtained by calculating an angle of a signal using a phase difference between the transmission signal and the reception signal. In this case, the trailer angle information may include an azimuth or an elevation angle.

However, the disclosure is not limited thereto, and the trailer information may include various pieces of information.

The angle calculation step may determine whether the distance information between the host vehicle and the trailer included in the trailer information is included in a preset range, and when it is determined that the distance information is included in the preset range, calculate the trailer hitch angle. (S630)

If the distance information between the host vehicle and the trailer is not included in the preset range, it may not be necessary to calculate the hitch angle between the host vehicle and the trailer. The reason why the hitch angle is required is that there may be a case in which the vehicle and the trailer are fastened using the hitch. Accordingly, the angle calculation step S630 preemptively determines whether the distance information between the host vehicle and the trailer is included in the preset range. Hereinafter, a detailed configuration necessary for calculating the hitch angle by the angle calculation step S630 is described.

For example, the preset range may mean a value set using a maximum length detectable by the radar sensor and an error range. The maximum length detectable by the radar sensor may be A m (where A is a real number larger than or equal to 0), and the error may be set to ±B % (where B is a real number larger than or equal to 0).

For example, the preset range may be set to a value obtained by adding or subtracting ±B %, which is the error, to/from A m. For example, the preset range may be set to a ±10% range with respect to the maximum length of 6 m that may be detected by the radar sensor.

However, the maximum length detectable by the radar sensor and error may be set to differ according to the performance of the radar sensor, and the maximum length detectable by the radar sensor and error may be set to differ according to the lengths of the vehicle and the trailer detected by the radar sensor.

Accordingly, the maximum length detectable by the radar sensor and error may be set without being limited to the present embodiment.

For example, the trailer hitch angle may refer to an angle formed by the host vehicle and the trailer. Further, the trailer hitch angle may correspond to at least one of a transverse angle or a longitudinal angle formed by the host vehicle and the trailer. However, the present embodiment is not limited, and the trailer hitch angle may be set to various ones.

The storing step may map the host vehicle information, the trailer information, and the trailer hitch angle and store them as a set. (S640)

For example, the storing step may map the host vehicle velocity information, the host vehicle rate information, the distance information between the host vehicle and the hitch, and the trailer hitch angle included in the host vehicle information, and store them as a set. Further, the storing step may map the trailer velocity information and the trailer hitch angle included in the trailer information and store the same as a set. Alternatively, the storing step may map the host vehicle velocity information, the host vehicle rate information, the distance information between the host vehicle and the hitch, the trailer velocity information, and the trailer hitch angle and store them as a set. However, the present embodiment is not limited thereto, and the storing step may map various pieces of information and store the same as a set.

When the number of sets meets a number condition, the calculation step may calculate the trailer yaw rate and the trailer length using the set and an optimization algorithm. (S650)

Embodiments of the disclosure are ones for estimating and calculating dynamic information about a trailer including a trailer yaw rate and a trailer length. If a sufficient number of sets are not stored in the storing step S640, accuracy may be reduced when calculating the trailer yaw rate and the trailer length. Accordingly, the number condition is set to determine whether the number of sets stored in the storing step is sufficient.

For example, the number condition may be set using C (where C is an integer larger than or equal to 1). For example, the number condition may be set as whether the number of sets is larger than C. As another example, the number condition may be set as whether the number of sets is smaller than C. However, without being limited to the present embodiment, the number condition may be set.

For example, the optimization algorithm may be a gradient descent algorithm.

The gradient descent algorithm is an algorithm that obtains the slope of a function, continues to move in the opposite direction of the slope, and repeats it until it reaches an extreme value. The gradient descent algorithm is an algorithm used to solve machine learning, deep learning, and mathematical problems.

The gradient descent algorithm according to the present embodiment may be utilized to find the optimal solution of the trailer rate and the trailer length based on the host vehicle velocity information, the host vehicle rate information, the distance information between the host vehicle and the trailer, and the trailer hitch angle included in the set.

However, without being limited the present embodiment, the optimization algorithm may be any algorithm capable of finding the optimal solution of the trailer yaw rate and the trailer length.

For example, the trailer yaw rate is an estimated value of the yaw rate (horizontal rotation velocity) of the trailer, and may mean an optimal solution of the estimated value of the yaw rate of the trailer found using the gradient descent algorithm.

For example, the trailer length is an estimated length value of the trailer, and may mean an optimal solution of the estimated length value of the trailer found using the gradient descent algorithm.

For example, the trailer information obtaining step may re-receive the trailer information, and the calculation step may re-receive the trailer information and evaluate the trailer length using the re-received trailer information. Even if the trailer length is calculated, it is necessary to verify whether the calculated trailer information is reliable information. Accordingly, the trailer information obtaining step may re-receive the trailer angle information and the distance information between the host vehicle and the trailer included in the trailer information. The operation of the calculation step to re-receive the trailer information and evaluate the trailer length using the re-received trailer information is described with reference to a specific example.

For example, the calculation step may evaluate the trailer length by comparing the re-received trailer information with the trailer length. In this case, when it is determined that the re-received trailer information is longer than the trailer length, the calculation step may recalculate the trailer yaw rate and the trailer length.

In other words, when it is determined that the distance information between the host vehicle and the trailer included in the re-received trailer information is larger than the trailer length, it may be determined that the trailer length is incorrectly calculated. In this case, the trailer length may be recalculated. Further, since the trailer yaw rate may change when the trailer length is recalculated, the trailer yaw rate may also be recalculated.

The above-described dynamic information estimation device and dynamic information estimation method according to the present embodiment may be implemented as a program and recorded on a computer-readable recording medium. In other words, the operations of each component or each step of the disclosure described above with reference to FIGS. 1 to 6 may be implemented as a program described below and may be implemented according to each operation included in a computer-readable recording medium. No detailed description of some embodiments or some operations described in connection with FIGS. 1 to 6 may be given below for avoiding repetition of description, but the above-described dynamic information estimation device or dynamic information estimation method may be performed likewise by the functions included in the following recording medium.

For example, a computer-readable, non-transitory recording medium storing a computer-executable program instruction executed by a processor to operate a computer system may implement receiving host vehicle information using one or more sensors, obtaining trailer information using a radar sensor when it is determined that the trailer information is required using the host vehicle information and a yaw rate threshold, determining whether distance information between a host vehicle and a trailer included in the trailer information is included in a preset range and, if it is determined that the distance information is included in the preset range, calculating a trailer hitch angle, mapping the host vehicle information, the trailer information, and the trailer hitch angle and storing as a set, and calculating a trailer yaw rate and a trailer length using the set and an optimization algorithm if a number of sets meets a number condition.

As an example, the host vehicle information may include at least one of host vehicle velocity information, host vehicle yaw rate information, and distance information between the host vehicle and the hitch.

As another example, when it is determined that the host vehicle yaw rate information included in the host vehicle information exceeds the yaw rate threshold, the trailer information obtaining step may determine that the trailer information is necessary.

As another example, the trailer information may include at least one of trailer velocity information, trailer angle information, and distance information between the host vehicle and the trailer.

Meanwhile, the optimization algorithm may be a gradient descent algorithm.

Further, individual step operations included in the recording medium according to the present embodiment may implement all of the operations of each component or each step described in the disclosure.

Examples of the computer-readable recording medium include ROMs, RAMs, CD-ROMs, magnetic tapes, floppy disks, or optical data storage devices, or carrier wave-type implementations (e.g., transmissions through the Internet). Further, the computer-readable recording medium may be distributed to computer systems or servers connected via a network, and computer-readable codes may be stored and executed in a distributed manner.

Functional programs, codes and code segments for implementing the disclosure may be easily inferred by programmers in the same technical field.

The present embodiment may execute corresponding operations by communicating with a computer system or server storing a recording medium storing a program for executing the dynamic information estimation method to read the program stored in the recording medium.

As an example, the recording medium storing the program for executing the method according to the present embodiment may be stored in a web server that stores such an application program and provides the application program to a desired terminal, to be used for web store service technology. Further, the recording medium storing the program for executing the method according to the present embodiment may be stored in, e.g., a server to be used for service technology for transmitting it to a control device.

Although it is described above that all of the components are combined into one or are operated in combination, embodiments of the disclosure are not limited thereto. One or more of the components may be selectively combined and operated as long as it falls within the scope of the objects of the disclosure. Further, although all of the components may be implemented in their respective independent hardware components, all or some of the components may be selectively combined to be implemented in a computer program with program modules performing all or some of the functions combined in one or more hardware components. The codes and code segments constituting the computer program may be easily inferred by one of ordinary skill in the art to which the disclosure pertains. The computer program may be stored in computer readable media and be read and executed by a computer to implement embodiments of the disclosure. The storage medium of the computer program may include a magnetic recording medium, an optical recording medium, a carrier wave medium, and the like.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A dynamic information estimation device, comprising:

a vehicle information receiver receiving host vehicle information using one or more sensors;

a trailer information obtainer obtaining trailer information using a radar sensor when host vehicle yaw rate information included in the host vehicle information exceeds a yaw rate threshold;

an angle calculator determining whether distance information between a host vehicle and a trailer included in the trailer information is included in a preset range and, if it is determined that the distance information is included in the preset range, calculating a trailer hitch angle;

a storage unit mapping the host vehicle information, the trailer information, and the trailer hitch angle and storing as a set; and a calculator calculating a trailer yaw rate and a trailer length using the set and an optimization algorithm if a number of sets meets a number condition, wherein the trailer information obtainer re-receives the trailer information, and wherein the calculator recalculates the trailer yaw rate and the trailer length if it is determined that a distance between a host vehicle and a trailer according to the re-received trailer information is longer than the trailer length.

2. The dynamic information estimation device of claim 1, wherein the host vehicle information includes at least one of host vehicle velocity information, host vehicle yaw rate information, and distance information between the host vehicle and a hitch.

3. The dynamic information estimation device of claim 1, wherein the trailer information obtainer determines that the trailer information is required if it is determined that host vehicle yaw rate information included in the host vehicle information exceeds the yaw rate threshold.

4. The dynamic information estimation device of claim 1, wherein the trailer information includes at least one of trailer velocity information, trailer angle information, and distance information between the vehicle and the trailer.

5. The dynamic information estimation device of claim 1, wherein the optimization algorithm is a gradient descent algorithm.

6. The dynamic information estimation device of claim 1, wherein the calculator evaluates the trailer length using the re-received trailer information.

7. The dynamic information estimation device of claim 6, wherein the calculator evaluates the trailer length by comparing the distance between the host vehicle and the trailer according to the re-received trailer information with the trailer length.

8. A dynamic information estimation method, comprising:

receiving host vehicle information using one or more sensors;

obtaining trailer information using a radar sensor when host vehicle yaw rate information included in the host vehicle information exceeds a yaw rate threshold;

determining whether distance information between a host vehicle and a trailer included in the trailer information is included in a preset range and, if it is determined that the distance information is included in the preset range, calculating a trailer hitch angle;

mapping the host vehicle information, the trailer information, and the trailer hitch angle and storing as a set; and calculating a trailer yaw rate and a trailer length using the set and an optimization algorithm if a number of sets meets a number condition, wherein the obtaining includes re-receiving the trailer information, and wherein the calculating includes recalculating the trailer yaw rate and the trailer length if it is determined that a distance between a host vehicle and a trailer according to the re-received trailer information is longer than the trailer length.

9. The dynamic information estimation method of claim 8, wherein the host vehicle information includes at least one of host vehicle velocity information, host vehicle yaw rate information, and distance information between the host vehicle and a hitch.

10. The dynamic information estimation method of claim 8, wherein obtaining the trailer information determines that the trailer information is required if it is determined that host vehicle yaw rate information included in the host vehicle information exceeds the yaw rate threshold.

11. The dynamic information estimation method of claim 8, wherein the trailer information includes at least one of trailer velocity information, trailer angle information, and distance information between the vehicle and the trailer.

12. The dynamic information estimation method of claim 8, wherein the optimization algorithm is a gradient descent algorithm.

13. The dynamic information estimation method of claim 8, wherein the calculating evaluates the trailer length using the re-received trailer information.

14. A computer-readable, non-transitory recording medium storing a computer-executable program instruction executed by a processor to operate a computer system, comprising:

receiving host vehicle information using one or more sensors;

obtaining trailer information using a radar sensor when host vehicle yaw rate information included in the host vehicle information exceeds a yaw rate threshold;

determining whether distance information between a host vehicle and a trailer included in the trailer information is included in a preset range and, if it is determined that the distance information is included in the preset range, calculating a trailer hitch angle;

mapping the host vehicle information, the trailer information, and the trailer hitch angle and storing as a set; and calculating a trailer yaw rate and a trailer length using the set and an optimization algorithm if a number of sets meets a number condition, wherein the obtaining includes re-receiving the trailer information, and wherein the calculating includes recalculating the trailer yaw rate and the trailer length if it is determined that a distance between a host vehicle and a trailer according to the re-received trailer information is longer than the trailer length.

15. The computer-readable, non-transitory recording medium of claim 14, wherein the host vehicle information includes at least one of host vehicle velocity information, host vehicle yaw rate information, and distance information between the host vehicle and a hitch.

16. The computer-readable, non-transitory recording medium of claim 14, wherein obtaining the trailer information determines that the trailer information is required if it is determined that host vehicle yaw rate information included in the host vehicle information exceeds the yaw rate threshold.

17. The computer-readable, non-transitory recording medium of claim 14, wherein the trailer information includes at least one of trailer velocity information, trailer angle information, and distance information between the vehicle and the trailer.

18. The computer-readable, non-transitory recording medium of claim 14, wherein the optimization algorithm is a gradient descent algorithm.

* * * * *